Patented Aug. 7, 1945

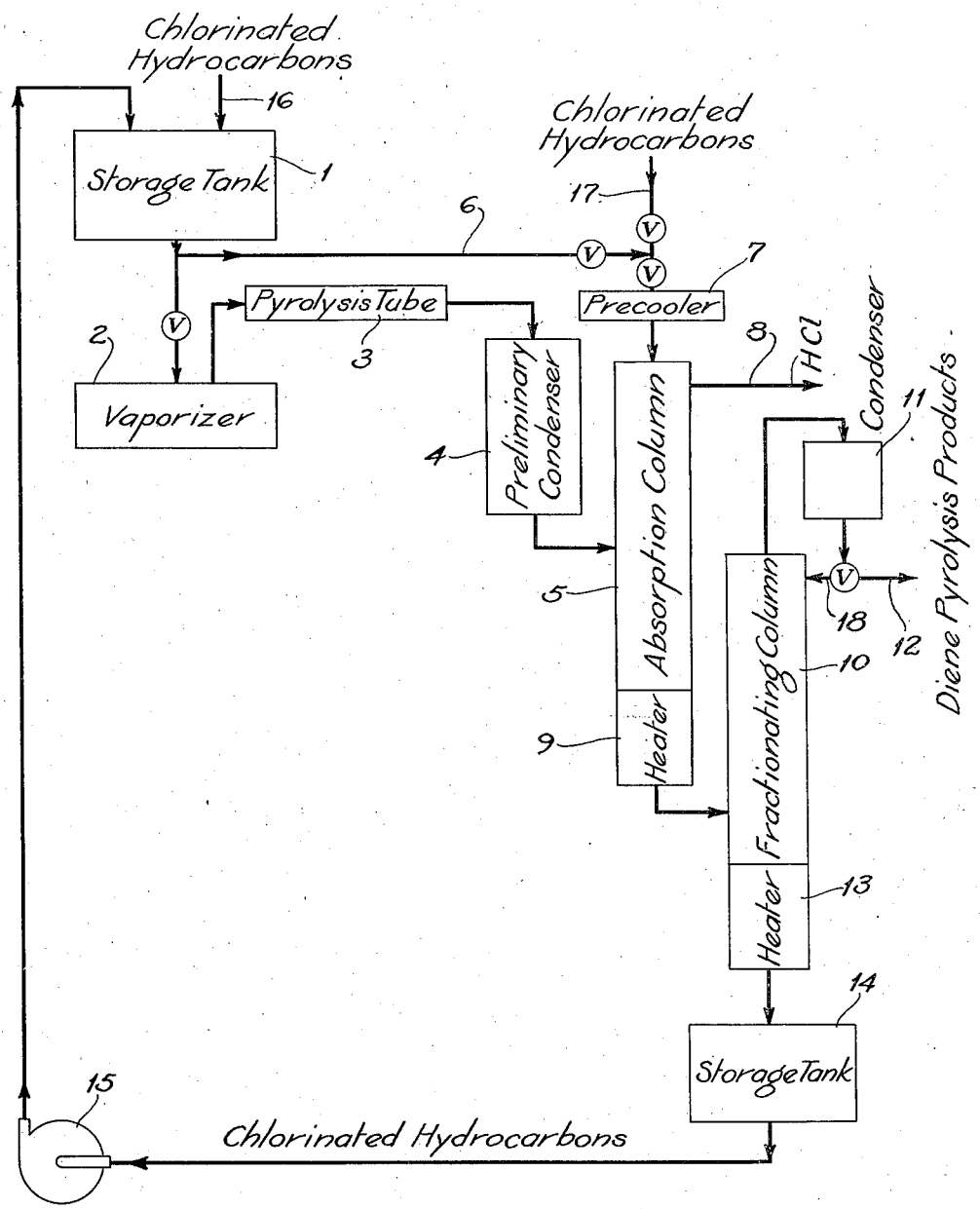

2,381,038

UNITED STATES PATENT OFFICE 2,381,038

SEPARATION PROCESS

Albert S. Carter and Albert V. Willett, Jr., Wilmington, Del., assignors to E. I. du Pont de Nemours & Company, Wilmington, Del., a corporation of Delaware Application May 23, 1941, Serial No. 394,822

9 Claims. (Cl. 260—655)

This invention relates to processes for the separation of pyrolysis products; more particularly, it relates to the separation of diolefines and halogen substituted diolefines from the gaseous by-products resulting from pyrolysis; still more particularly, it relates to the separation of 1,3-butadiene and chloro-1,3-butadiene, the chloro-butanes and chlorobutenes, from which they are formed by pyrolysis, from the hydrogen chloride and other so-called permanent gases formed as by-products in the pyrolysis process.

It is known that butadiene may result from the high temperature pyrolysis of chlorobutene and dichlorobutane in the absence of acid acceptors, for example, by the thermal treatment of 2,3-dichlorobutane at 600–700° C. for a short contact time such as 0.3 second in packed or unpacked tubes of inert material. It is also known that 2-chloro-1,3-butadiene results from similar treatment of 2,2,3-trichlorobutane or from dichlorobutenes resulting from the chlorination of 2-chlorobutene or from the dichlorobutenes resulting from the incomplete pyrolysis of 2,2,3-trichlorobutane. These pyrolytic procedures result in the diolefine or chlorodiolefine mixed with a variable amount of intermediate unsaturated chloro compounds, hydrogen chloride, and in some cases, very small amounts of methane or hydrogen or other so-called permanent gases.

In the processes of the prior art, it has been suggested that the 1,3-butadiene or chloro-1,3-butadiene, which hereinafter will be referred to as the "conjugated dienes," and the incompletely converted unsaturated chloro compounds be separated from the by-product gaseous compounds; namely, hydrogen chloride and possible small amounts of other permanent gases by cooling or fractional distillation. For the complete removal of these materials from the permanent gases by fractional distillation or by fractional condensation, either compression or low temperatures are required. Even in the absence of hydrogen and methane, it is necessary to approach the temperature and pressure of liquid hydrogen chloride in order to condense completely the organic material from the by-product hydrogen chloride. Low temperature refrigeration and compression of this corrosive gaseous mixture are expensive and an alternate process is desirable.

It has also been proposed in the prior art to pass the gaseous mixture after a preliminary condensation through water scrubbers in which the hydrogen chloride is dissolved, thereby assisting in the complete condensation of the "conjugated diene." In this process, the hydrogen chloride is recovered as a dilute aqueous solution and its by-product value is impaired.

The object of the present invention is to provide a new method of separating the "conjugated dienes" and the incompletely converted reactants from the by-product hydrogen chloride without the disadvantages of the prior art. This object has been accomplished by scrubbing the products of pyrolysis with a chloro hydrocarbon capable of conversion by pyrolysis to the "conjugated diene" or, in other words, by the absorption of the "conjugated dienes" and the remaining incompletely converted reactants, from the by-product hydrogen chloride, by absorption of said "conjugated dienes" and reactants in the raw materials for the pyrolysis from which they are recovered in the normal course of the operation without resort to special treatment. We have found that the chlorobutanes and the chlorobutenes capable of being subsequently pyrolyzed to the "conjugated dienes" are excellent solvents for the "conjugated dienes" and capable of absorbing them from gaseous mixture of hydrogen chloride without absorbing substantial amounts of the hydrogen chloride itself. For the purpose of absorptive separation of the "conjugated dienes" from hydrogen chloride, it is desirable to have an absorptive medium possessing a lower vapor pressure than the "conjugated dienes" themselves; in fact, possessing a sufficiently low vapor pressure that the loss due to evaporation in the uncondensed stream of hydrogen chloride will be small. It has been found that these properties are satisfied by the raw materials subsequently used in the pyrolysis for the production of "conjugated dienes."

For example, in the production of 1,3-butadiene by pyrolytic procedures, the vapor pressure of the di-chlorobutane used as a starting material in the pyrolytic procedure is of the order of 20 millimeters of mercury or less at room temperature. Therefore, it may be used to scrub the by-product hydrogen chloride without substantial loss by evaporation and, if desired, the temperature of the absorption system can be reduced somewhat below room temperature and this loss materially reduced. In the manufacture of chloro-1,3-butadiene by the pyrolysis of 2,2,3-trichlorobutane, the vapor pressure of the starting material is less than 10 millimeters at room temperature.

The accompanying drawing, consisting of a single figure, is a flow sheet of the process, the apparatus and its arrangement being diagrammatic.

There are several arrangements of equipment which will satisfactorily accomplish the purpose of this invention, but all will possess the essential features illustrated in the figure. Referring to the figure, the chlorinated raw materials for pyrolysis are stored in tank 1 from which it flows through any desired measuring device and control valve into vaporizer 2 from which it is volatilized through the pyrolysis tube 3. The gases leaving the pyrolysis tube may, if desired, pass through a preliminary condenser 4 in which the temperature is reduced and the major portion of the unreacted raw materials and products are condensed. The gases and liquids from 4 enter the absorption column 5. In 5, the products from the pyrolysis contact the unreacted chloro compounds which are introduced into the top of the column from the storage tank 1 through line 6 and precooler 7. Unabsorbed gases leave column 5 via vent 8 and the liquid products in column 5 pass down through heater 9 in which the temperature is maintained at or near the boiling point of the "conjugated diene" in order to volatilize the last small amount of absorbed hydrogen chloride. The liquid product is discharged into the column 10. The liquids in column 10 are boiled by means of a heater 13 at the bottom, distilling off the "conjugated diene" product through condenser 11 and liquid line 12. This column may be any conventional fractionating column equipped with a total condenser and reflux runback of the usual type to divide the condensate between 12 and the reflux line 13 returning to the column. The undistilled liquids from column 10 are discharged continuously into the storage tank 14 from which they are pumped by means of pump 15 back to storage tank 1 for further pyrolysis. In the operation of the apparatus illustrated for the manufacture of "conjugated dienes," unconverted chloro compounds are recovered from the "conjugated diene" product in column 10. By-product hydrogen chloride issues from vent 8 essentially free of "conjugated diene" and unconverted chloro compounds. For example, in the manufacture of chloro-1,3-butadiene storage tank 1 initially may be charged with 2,2,3-trichlorobutane or the dichlorobutene or a mixture of these various starting materials which are fed under controlled conditions into the vaporizer 2, thence through pyrolysis tube 3 and condenser 4 into column 5 in which they are scrubbed by means of liquors from tank 1 yielding anhydrous hydrogen chloride at 8 and the resulting mixture of chloro compounds through heater 9 and column 10. In column 10, the 2-chloro-1,3-butadiene is distilled off through line 12 and the mixture of unconverted 2,2,3-trichlorobutane and dichlorobutene which collects in tank 14 is subsequently pumped by means of pump 15 into the original tank 1. Recirculation of the recovered material results in a variable composition of the material in tank 1, but, as stated before, the vapor pressure of the mixture is satisfactory for the scrubbing operation in column 5. In proportion to the "conjugated diene" product removed at 12, it is necessary to introduce fresh raw material at line 16 to replenish the stock. In the manufacture of 1,3-butadiene by this procedure, tank 1 may be charged initially with dichlorobutane, such as 2,3-dichlorobutane and a similar operating cycle carried out. Obviously, in the manufacture of 1,3-butadiene, the temperatures in 4, 9, and in the bottom of column 10 should be lower than the respective temperatures in the manufacture of chloro-1,3-butadiene, but the procedure can be carried out in essentially the same manner.

A further modification which has been found to assist materially in the complete removal of organic products from the by-product anhydrous hydrogen chloride is to introduce all of the fresh chlorinated raw material into the top of column 5 through line 17 instead of into tank 1 through line 16. In this manner, the scrubbing liquid introduced at the top of column 5 contains only the higher boiling raw materials prior to pyrolysis and is not diluted with some of the more volatile intermediate products present in storage tank 1. In this case, the liquid feed through line 17 may or may not be diluted with further liquid from tank 1 as desired.

In order that the process may be more fully understood, the following specific examples are given. Such examples are merely by way of illustration. The invention is not limited thereto, but suitable variations may be made as will become more apparent hereinafter.

*Example I*

Using the apparatus illustrated in the figure, introducing fresh chloro raw materials at 16 and precooling the liquor at 7 to −20° C., the cyclic operation was carried out for the pyrolysis of 2,3-dichlorobutane using a contact time of 0.3 second and a silica pyrolysis tube held at 650° C. In this case, column 5 was jacketed with brine at −15° C. to −20° C. over the upper two-thirds of its length and the introduction of the crude material from condenser 4 was made below this brine jacket. During this operation, the heater 13 at the bottom of column 10 was maintained to give a liquid temperature of approximately 100° C. During this operation, each mole of 2,3-dichlorobutane introduced into 1 gave approximately 1.75 moles of hydrogen chloride at outlet 8 and a liquid condensate consisting of approximately 0.8 mole of 1,3-butadiene and 0.15 mole of chlorobutene at outlet 12 with the liquid feed at the top of column 5 held at substantially −20° C. The anhydrous hydrogen chloride issuing at 8 contained only a fraction of a per cent of organic material.

*Example II*

The apparatus illustrated in the figure was used as in Example I with one modification: fresh chloro raw materials were introduced at 17 instead of 16. Precooler 7 was maintained at a temperature of 0° C. to 10° C. to cool the liquids entering column 5. Tank 1 was charged with 2,2,3-trichlorobutane which was fed through a "rotometer" (a device for measuring rate of flow) into vaporizer 2 held at 190° C. at the rate of 1 pound-mole per hour. The vapors were conducted through a silica pyrolysis tube maintained at 650° C. at a contact time of 0.3 second, thence to condenser 4 in which the products were cooled to approximately room temperature. Column 5 which was 6 inches in diameter and 15 feet long was packed with porcelain rings and was fed only with the fresh trichlorobutane added to replace that consumed in the reaction. During the first period of the operation, 2-chloro-1,3-butadiene issued from outlet 12 at the rate of approximately 0.20 pound mole per hour and hydrogen chloride issued from line 8 at the rate of approximately 1.0 pound mole per hour. As the operation was continued due to the recirculation of partially converted material (dichlorobutene), the rate of production of 2-chloro-1,3-butadiene at 12 increased to over 0.25 pound mole per hour and the production of hydrogen chloride at 8 decreased to 0.77 pound mole per hour. Examination of the products showed that the 2-chloro-1,3-butadiene issuing at 12 was essentially pure and of suitable quality for polymerization to rubber-like products. Examination of the gas issuing at 8 showed that it was anhydrous and substantially over 99 per cent hydrogen chloride containing approximately 0.6 per cent chlorinated hydrocarbons and a fraction of a per cent of hydrogen. Upon continued operation, each mole of trichlorobutane introduced into the system, provided approximately 0.60 to 0.70 mole of 2-chloro-1,3-butadiene, approximately 2 moles hydrogen chloride at 8, carbon deposited in 3 and 4 equivalent to approximately 0.05 to 0.10 mole of trichlorobutane, and a residue remaining in vaporizer 2 analyzing to a chemical composition equivalent to polymerized 2-chloro-1,3-butadiene in an amount of approximately 0.25 to 0.3 mole.

*Example III*

An apparatus similar to the figure was constructed, precooler 7 at the top of column 5 being a low temperature dephlegmator held at −70° C. capable of giving substantial reflux in column 5 consisting of condensed intermediates and raw materials. For the purpose of analysis, the gas issuing from line 8 was conducted into an analytical absorption system provided for the measurement of hydrogen chloride, permanent gas, and water-insoluble liquid product. For the purpose of analytical examination, the product was removed from the bottom of column 5, omitting column 10, tank 14, and the recirculating pump 15.

Nine hundred and eighty-three (983) grams of 2,2,3-trichlorobutane was volatilized in 326 minutes and passed through a pyrolysis tube constructed of copper held at 480° C. with a contact time of 8 seconds. The gas issuing from outlet 8 was found to contain 129.2 grams hydrogen chloride and a few cc. of permanent gas. The liquid product issuing from the bottom of the column weighed 821.4 grams. The total accounted for, therefore, was 950.7 grams or 96.7 per cent of the total starting material, the loss being due to a small amount of carbonization or handling losses in the vaporizer and sample-collecting vessels.

The separation process is applicable to the pyrolysis products from chlorobutanes and chlorobutenes. The above examples illustrate the pyrolysis of 2,2,3-trichlorobutane to 2-chloro-1,3-butadiene. In similar manner, it may be applied to the separation of products obtained from the pyrolysis of mixtures of 2,2,3-trichlorobutane and dichlorobutene obtained by chlorinating 2-chloro-2-butene as described in copending application Serial No. 336,626. It is also applicable to the products obtained by the pyrolysis of 1,4-dichloro-2-butene which results in 1-chloro-1,3-butadiene and of other chlorobutanes and chlorobutenes capable of producing 1,3-butadiene and chloro-1,3-butadienes. These "conjugated dienes" to which the process is applicable may be expressed by the formula $C_4H_{(6-x)}Cl_x$ wherein $x$ is a member of the group consisting of 0 and 1. The raw materials are chlorinated straight-chain hydrocarbons of the formula $C_4H_{(6+n-x)}Cl_{(n+x)}$ wherein $x$ is the same as before and $n$ is a member of the group consisting of 1 and 2. These formulae clearly indicate that the product is obtained by removing one or two moles of hydrogen chloride from the raw material.

As indicated in Examples I and II, the efficiency of the removal of carbonaceous material from the anhydrous hydrogen chloride gas stream may be enhanced by precooling at 7 or by cooling in column 5. It is also within the scope of the invention to operate the apparatus at pressures above atmospheric to facilitate condensation of the products, particularly in the case of butadiene, which boils at −4° C. to −5° C. It is also within the scope of the invention to operate column 10 at a different pressure from column 5. This has been particularly advantageous in the manufacture of chlorobutadiene which polymerizes readily at its atmospheric boiling point. In this case, we may operate column 10 under a pressure of, for example, 100 mm. of Hg, the residue collecting in 14 being returned to the system under pressure by means of pump 15. It is also within the scope of the invention to introduce other accessory equipment which may improve the quality of the product or facilitate the operation. For example, steam may be introduced in column 10 to provide for steam distillation of the products, adding at the same time suitable drying equipment for the liquor returned from 14 via 15 to 1. Apparatus may be introduced between heater 9 and column 10 to neutralize the remaining traces of hydrogen chloride existing in the liquids discharged from column 5.

Under certain conditions, it has been found advantageous to introduce a separator under condenser 4 capable of separating liquids which are introduced directly into column 10 from the gaseous products which are introduced in column 5, thereby minimizing the quantity of liquid heated at 9.

Obviously, the rate of pyrolysis, the design of the pyrolysis tube, materials of construction, etc., may comprise anything described in the prior art for these specific features and are not a part of the present invention. The design of column 5 may follow conventional well-known lines obvious to any one skilled in the art. The rate of liquid flow at 6 may be determined by conventional calculations or it may be determined experimentally by observing the rate at which the loss of organic material at 8 becomes a minimum. It will be found that the loss of organic material at 8 decreases with an increase in liquid flow at 6 until a minimum is reached which will approximate the quantity calculated from the partial pressure of the liquid introduced at 6 at the operating temperature. It has been found, for example, that the liquid flow through 6 should be at least 200 pounds per hour per square foot of cross section in column 5 in the normal operation of the examples cited. Higher liquid rates are advantageous.

It is clear that, while the process is continuous and cyclic in that each step must follow the preceding step in the order set forth, a time lag may occur between various steps. Thus, for example, the chlorinated hydrocarbons collected in storage tank 14 may be pumped intermittently by pump 15 to storage tank 1 instead of being pumped in a steady stream. Accordingly, the terms "continuous" and "continuously" are used in this application to include a process having intermittent operations of this nature.

It is apparent that many widely different embodiments of this invention may be made without departing from the spirit and scope thereof, and, therefore, it is not intended to be limited except as indicated in the appended claims.

We claim:

1. Process which comprises continuously producing hydrogen chloride and a conjugated diene of the formula $C_4H_{(6-x)}Cl_x$ wherein $x$ is a small whole number of the group consisting of 0 and 1 by pyrolyzing, in a pyrolysis zone, at least one chlorinated straight-chain hydrocarbon of the formula $C_4H_{(6+n-x)}Cl_{(n+x)}$ wherein $x$ is the same as above and $n$ is a small whole number of the group consisting of 1 and 2, continuously passing the gases from the pyrolysis zone into an absorption zone, continuously passing more chlorinated straight-chain hydrocarbon, of the above formula, in the liquid phase into said absorption zone, continuously venting gaseous hydrogen chloride from said absorption zone, continuously passing the liquid phase from said absorption zone into a fractionating zone, continuously removing the said conjugated diene in the vapor phase from said fractionating zone, continuously withdrawing the non-vaporized liquid from said fractionating zone, and continuously recirculating the non-vaporized liquid to the pyrolysis zone.

2. Process which comprises continuously producing hydrogen chloride and a conjugated diene of the formula $C_4H_{(6-x)}Cl_x$ wherein $x$ is a small whole number of the group consisting of 0 and 1 by pyrolyzing, in a pyrolysis zone, at least one chlorinated straight-chain hydrocarbon of the formula $C_4H_{(6+n-x)}Cl_{(n+x)}$ wherein $x$ is the same as above and $n$ is a small whole number of the group consisting of 1 and 2, continuously cooling the gases from the pyrolysis zone, continuously passing the resulting mixture of gas and liquid into an absorption zone, continuously passing more chlorinated straight-chain hydrocarbon of the above formula in the liquid phase into said absorption zone near the top thereof, continuously venting gaseous hydrogen chloride from near the top of the absorption zone, continuously passing the liquid phase from near the bottom of said absorption zone into a heating zone held at a temperature near the boiling point of the said conjugated diene, continuously passing the heated liquid into a fractionating zone having a heater at the bottom thereof, continuously removing the said conjugated diene in the vapor phase from near the top of the fractionating zone, continuously withdrawing the non-vaporized liquid from near the bottom of the fractionating zone, and continuously recirculating the non-vaporized liquid to the pyrolysis zone.

3. Process which comprises continuously producing hydrogen chloride and 2-chloro-1,3-butadiene by pyrolyzing, in a pyrolysis zone, a mixture of 2,2,3-trichlorobutane and dichlorobutenes, continuously passing the gases from the pyrolysis zone into an absorption zone, continuously passing more of said mixture of 2,2,3-trichlorobutane and dichlorobutenes, in the liquid phase, into said absorption zone, continuously venting gaseous hydrogen chloride from said absorption zone, continuously passing the liquid phase from said absorption zone into a fractionating zone, continuously removing the 2-chloro-1,3-butadiene in the vapor phase from said fractionating zone, continuously withdrawing the non-vaporized liquid from said fractionating zone, and continuously recirculating the non-vaporized liquid to the pyrolysis zone.

4. Process which comprises continuously producing hydrogen chloride and 2-chloro-1,3-butadiene by pyrolyzing, in a pyrolysis zone, a mixture of 2,2,3-trichlorobutane and dichlorobutenes, continuously cooling the gases from the pyrolysis zone, continuously passing the resulting mixture of gas and liquid into an absorption zone, continuously passing more of said mixture of 2,2,3-trichlorobutane and dichlorobutenes, in the liquid phase, into said absorption zone near the top thereof, continuously venting gaseous hydrogen chloride from near the top of the absorption zone, continuously passing the liquid phase from near the bottom of said absorption zone into a heating zone held at a temperature near the boiling point of the 2-chloro-1,3-butadiene, continuously passing the heated liquid into a fractionating zone having a heater at the bottom thereof, continuously removing the 2-chloro-1,3-butadiene in the vapor phase from near the top of the fractionating zone, continuously withdrawing the non-vaporized liquid from near the bottom of the fractionating zone, and continuously recirculating the non-vaporized liquid to the pyrolysis zone.

5. Process which comprises continuously producing hydrogen chloride and 2-chloro-1,3-butadiene by pyrolyzing, in a pyrolysis zone, 2,2,3-trichlorobutane, continuously passing the gases from the pyrolysis zone into an absorption zone, continuously passing more 2,2,3-trichlorobutane, in the liquid phase, into said absorption zone, continuously venting gaseous hydrogen chloride from said absorption zone, continuously passing the liquid phase from said absorption zone into a fractionating zone, continuously removing the 2-chloro-1,3-butadiene in the vapor phase from said fractionating zone, continuously withdrawing the non-vaporized liquid from said fractionating zone, and continuously recirculating the non-vaporized liquid to the pyrolysis zone.

6. Process which comprises continuously producing hydrogen chloride and 2-chloro-1,3-butadiene by pyrolyzing, in a pyrolysis zone, 2,2,3-trichlorobutane, continuously cooling the gases from the pyrolysis zone, continuously passing the resulting mixture of gas and liquid into an absorption zone, continuously passing more 2,2,3-trichlorobutane, in the liquid phase, into said absorption zone near the top thereof, continuously venting gaseous hydrogen chloride from near the top of the absorption zone, continuously passing the liquid phase from near the bottom of said absorption zone into a heating zone held at a temperature near the boiling point of the 2-chloro-1,3-butadiene, continuously passing the heated liquid into a fractionating zone having a heater at the bottom thereof, continuously removing the 2-chloro-1,3-butadiene in the vapor phase from near the top of the fractionating zone, continuously withdrawing the non-vaporized liquid from near the bottom of the fractionating zone, and continuously recirculating the non-vaporized liquid to the pyrolysis zone.

7. Process which comprises continuously producing hydrogen chloride and 1,3-butadiene by pyrolyzing, in a pyrolysis zone, dichlorobutane, continuously passing the gases from the pyrolysis zone into an absorption zone, continuously passing more dichlorobutane, in the liquid phase, into said absorption zone, continuously venting gaseous hydrogen chloride from said absorption zone, continuously passing the liquid phase from said absorption zone into a fractionating zone, continuously removing the 1,3-butadiene in the vapor phase from said fractionating zone, continuously withdrawing the non-vaporized liquid from said fractionating zone, and continuously recirculating the non-vaporized liquid to the pyrolysis zone.

8. Process which comprises continuously producing hydrogen chloride and 1,3-butadiene by pyrolyzing, in a pyrolysis zone, dichlorobutane, continuously cooling the gases from the pyrolysis zone, continuously passing the resulting mixture of gas and liquid into an absorption zone, continuously passing more dichlorobutane, in the liquid phase, into said absorption zone near the top thereof, continuously venting gaseous hydrogen chloride from near the top of the absorption zone, continuously passing the liquid phase from near the bottom of said absorption zone into a heating zone held at a temperature near the boiling point of the 1,3-butadiene, continuously passing the heated liquid into a fractionating zone having a heater at the bottom thereof, continuously removing the 1,3-butadiene in the vapor phase from near the top of the fractionating zone, continuously withdrawing the non-vaporized liquid from near the bottom of the fractionating zone, and continuously recirculating the non-vaporized liquid to the pyrolysis zone.

9. Process which comprises continuously producing hydrogen chloride and a conjugated diene of the formula $C_4H_{(6-x)}Cl_x$ wherein $x$ is a small whole number of the group consisting of 0 and 1 by pyrolyzing, in a pyrolysis zone, at least one chlorinated straight-chain hydrocarbon of the formula $C_4H_{(6+n-x)}Cl_{(n+x)}$ wherein $x$ is the same as above and $n$ is a small whole number of the group consisting of 1 and 2, continuously passing the gases from the pyrolysis zone into an absorption zone, continuously passing more chlorinated straight-chain hydrocarbon of the above formula in the liquid phase into said absorption zone, continuously venting gaseous hydrogen chloride from said absorption zone, and continuously recovering the liquid phase from said absorption zone.

ALBERT S. CARTER.
ALBERT V. WILLETT, Jr.